W. C. SMITH.
SANITARY MILK MEASURE.
APPLICATION FILED NOV. 22, 1918.
1,292,904.
Patented Jan. 28, 1919.
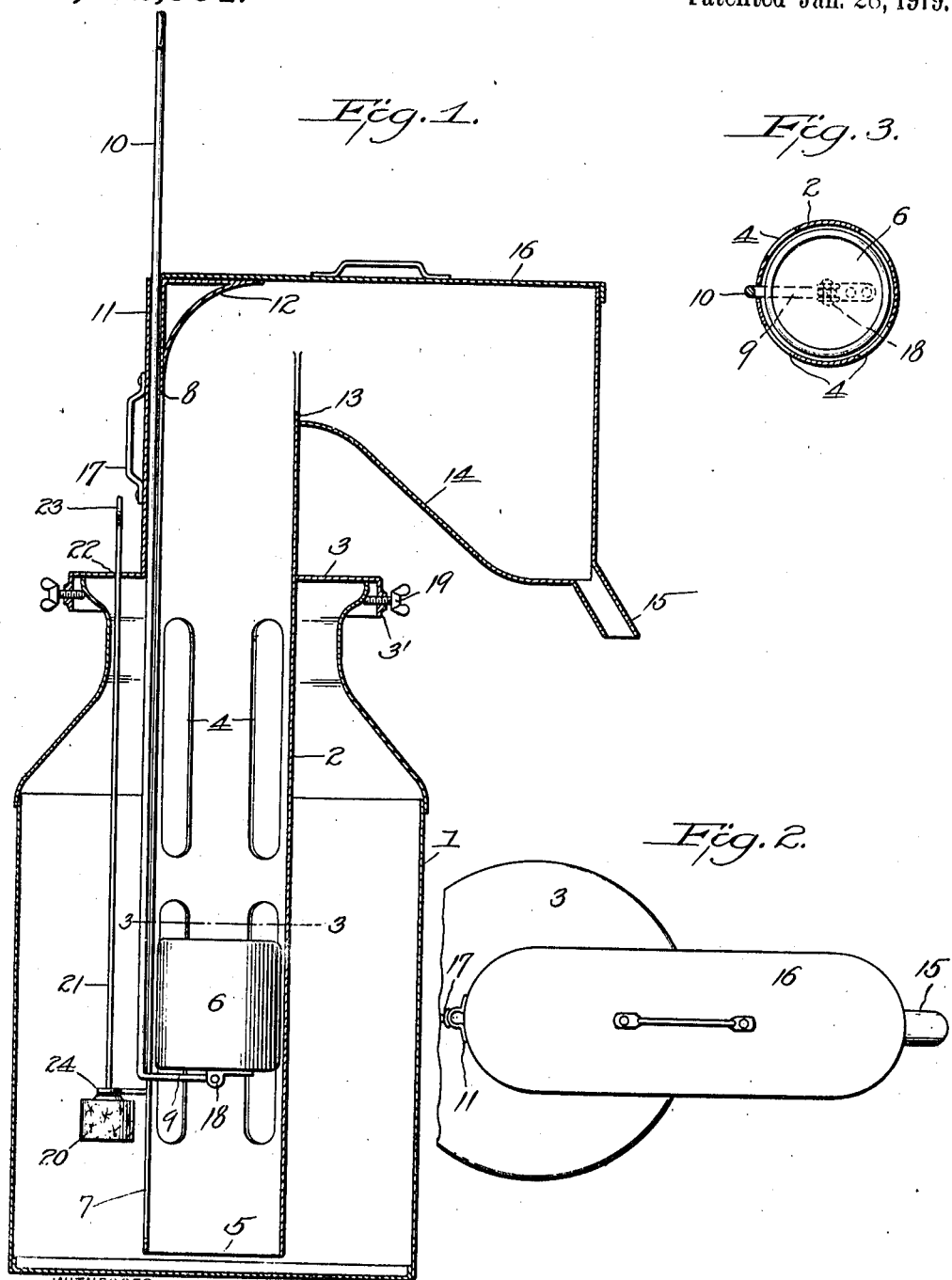

UNITED STATES PATENT OFFICE.

WILLIAM C. SMITH, OF MOUNT VERNON, NEW YORK.

SANITARY MILK-MEASURE.

1,292,904.  Specification of Letters Patent.  Patented Jan. 28, 1919.

Application filed November 22, 1918. Serial No. 263,717.

*To all whom it may concern:*

Be it known that I, WILLIAM C. SMITH, a citizen of the United States, and a resident of Mount Vernon, in the county of Westchester and State of New York, have invented a new and Improved Sanitary Milk-Measure, of which the following is a full, clear, and exact description.

This invention relates to measuring and dispensing devices for milk and the like and has for an object the provision of an improved construction wherein an accurate quantity may be quickly measured and dispensed at the same time.

Another object in view is to provide a measuring device for liquids which may be bodily set into a can or mold and operated quickly without impairing its accuracy.

A further object, more specifically, is the provision of means for measuring and dispensing milk from ordinary milk cans, the construction being such that the milk is agitated as the milk is measured and is automatically dispensed immediately after the measuring or simultaneously therewith.

In the accompanying drawing:

Figure 1 is a longitudinal vertical section through a device embodying the invention, same being shown applied to a milk can.

Fig. 2 is a top plan view of the measuring structure shown in Fig. 1.

Fig. 3 is a transverse horizontal section through the lower part of the measuring device, same being taken on line 3—3 of Fig. 1.

Referring to the accompanying drawing by numerals 1 indicates an ordinary milk can into which the guide 2 is to be inserted, said guide carrying a lid or cover 3 adapted to engage the upper edge of the can 1 and close the can as well as prevent the bottom edge of the guide 2 from striking the bottom of the can. This guide is shown as tubular and provided with a number of openings 4 as well as an open bottom 5, but it will be understood that the guide from lid 3 downwardly may be a plurality of bars, a wire cage or other open work guiding means for the measuring bucket 6. From the lid 3 upwardly the guide is preferably a solid tube so as to prevent any spilling of the milk or other liquid being dispensed. The guide, if made as a tube, is provided with a slot 7 extending from the bottom to a point 8 near the top so as to permit the arm 9 to properly operate, said arm being rigidly secured to or formed integral with rod 10 extending through the tubular guide 11. When the arm 9 is raised the measuring container 6 will be moved upwardly and will strike the rounded deflecting member 12 so as to tilt over the edge 13 and thereby discharge its contents into the hopper 14 from which it will pass through the spout 15 into any desired receptacle. A cover 16 is preferably provided for hopper 14 for permitting inspection and also for cleaning whenever desired. If desired a handle 17 may be provided so as to raise and lower the device when applying and removing the same, and also for use in easy transportation for short distances.

The container 6 may be of any size, as for instance a quart size and acts as a stirring or mixing member for the milk or other fluid as well as a dispensing device. When this container is forced downwardly it will naturally agitate the milk and will be positioned so as sufficient milk will be permitted to fill the same, so that when the rod 10 is elevated the filled container will be moved upwardly and will discharge into hopper 14 from which the milk will pass through the spout 15. The action of moving upwardly and downwardly the container 6 is easy and will quickly and accurately measure a certain quantity of milk, as for instance a quart and will almost at the same time dispense the same so that at each upward movement of the container 6 a given measured quantity will be discharged out the spout 15. It will, of course, be noted that the container 6 is pivotally mounted at 18 on the arm 9 so as to freely swing over to discharge its contents into the hopper 14 when rod 10 is moved upwardly and to swing back to its former position when the rod is again moved downwardly.

In order to hold the device in proper position on a can or container of any kind the depending flange 3' of the cover 3 is provided with one or more set screws 19 as illustrated in Fig. 1 which clamps against the can and which may be quickly and easily disengaged at any time. Also it will be observed from Fig. 1 that a float 20 is provided connected with rod 21 and extending through an aperture 22 acting as a guide so that the loop or handle 23 at the top may be easily operated and may act as a stop for limiting the downward movement of the rod 21. A stop 24 is provided near the bottom which limits the upward movement of the rod, said stop being connected in any desired way with the guide 2. When the can is full of milk or other liquid the float 20 and associate parts are in the position shown in Fig. 1 so that the height of the handle 23 will indicate that there is ample liquid for providing a full measure for the container or measuring device 6. When the handle 23 begins to lower it will indicate that care must be taken in operating the rod 10 and container 6 in order to secure full measure. After the handle 23 has moved down a short distance, as for instance half of its travel, it will indicate that it will be necessary, or at least advisable to add more milk in the can or place the device on another can, as a full quantity or quart will not be provided on each operation of the rod 10.

What I claim is:

1. A measuring device for dispensing milk comprising a foraminous guide, a hopper in communication with the guide, said hopper having a discharge opening, a container arranged in said guide for receiving milk from the receptacle in which the guide is positioned, a rod having an offset arm pivotally connected to the bottom of said container, said rod extending to a position above the hopper so as to be moved upwardly and downwardly along the guide for elevating and depressing said container, and means arranged along the upper edge of said guide for tilting said container for causing the same to dump the contents thereof into said hopper.

2. A measuring device for liquids comprising a foraminous substantially tubular guide adapted to be inserted into a receptacle, a hopper connected to the upper end of said guide, said hopper having a discharge opening, a tubular member arranged adjacent said guide, a rod slidingly mounted in said tubular member, an arm connected with said rod extending at right angles to the rod into the guide, a container loosely positioned on said guide, means for pivotally connecting the bottom of the container with said arm, and means for causing the container to tilt toward said hopper when moved to its extreme upper position whereby the contents thereof is dumped into the hopper.

3. A dispensing and measuring device for milk comprising a tubular member solid at the top and foraminous adjacent its bottom, the foraminous member being fitted into a milk can, a lid adapted to be connected to said tubular member adjacent the lower part of the solid section thereof, said lid resting on the top of said milk can, said tubular member being formed with a slot extending from near the bottom to near the top, a container arranged in said tubular member which acts as a guide therefor, a rod positioned to move parallel with the tubular member, said rod having an arm projecting through said slot, means for pivotally connecting said arm with said container, a receiving hopper having a discharge opening merging into the top of said tubular member, and means at the top of the tubular member for tilting said container so as to discharge the contents thereof into said hopper.

WILLIAM C. SMITH.